United States Patent
Bouldin et al.

(10) Patent No.: US 9,904,518 B1
(45) Date of Patent: Feb. 27, 2018

(54) SUPPORT OF UNDEVELOPED FEATURES IN MULTI-USER CAX ENVIRONMENT

(71) Applicant: United Technologies Corporation, Hartford, CT (US)

(72) Inventors: Lee Edward Bouldin, Woodbridge, CT (US); Joshua Daniel Winn, Ellington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 136 days.

(21) Appl. No.: 14/598,575

(22) Filed: Jan. 16, 2015

(51) Int. Cl.
*G06F 9/44* (2006.01)
*H04L 29/06* (2006.01)
*G06F 17/30* (2006.01)

(52) U.S. Cl.
CPC .......... *G06F 8/20* (2013.01); *G06F 17/30179* (2013.01); *H04L 65/403* (2013.01)

(58) Field of Classification Search
CPC ..... G06F 8/20; G06F 17/30179; H04L 65/403
USPC ........................................................ 717/104
See application file for complete search history.

(56) References Cited

U.S. PATENT DOCUMENTS

| | | | | |
|---|---|---|---|---|
| 6,298,319 B1 * | 10/2001 | Heile | ................. | G01R 31/3177 703/26 |
| 6,912,565 B1 * | 6/2005 | Powers | ................... | G06T 15/00 709/205 |
| 8,229,715 B1 * | 7/2012 | Teller | ...................... | G06F 17/50 434/72 |
| 8,566,066 B2 * | 10/2013 | Thompson | .............. | G06F 17/50 345/420 |
| 9,134,962 B1 * | 9/2015 | Stephens | ................... | G06F 8/20 |
| 2008/0185368 A1 * | 8/2008 | Fagan | ................... | B23K 7/001 219/124.21 |
| 2012/0317497 A1 * | 12/2012 | Red | ......................... | G06F 17/50 715/751 |
| 2013/0144566 A1 * | 6/2013 | De Biswas | ........... | G06T 17/005 703/1 |
| 2013/0239011 A1 * | 9/2013 | Red | ........................ | G06F 17/50 715/743 |
| 2014/0149882 A1 * | 5/2014 | Nysetvold | ............. | H04L 65/403 715/751 |

(Continued)

OTHER PUBLICATIONS

Red et al., NXConnect: multi-User CAx on a Commercial Engineering Software Application, Department of Mechanical Engineering, Brigham young University (2010), Applicant Provided Art.*

(Continued)

*Primary Examiner* — Lewis A Bullock, Jr.
*Assistant Examiner* — Theodore Hebert
(74) *Attorney, Agent, or Firm* — Carlson, Gaskey & Olds, P.C.

(57) ABSTRACT

A system for collaborating on a component according to an exemplary aspect of the present disclosure includes, among other things, a computing device configured to execute an editing module. The editing module is configured to generate at least one developed feature of the component design in response to executing at least one global command relating to a multi-user CAx command set, and to generate at least one undeveloped feature of the component design in response to executing at least one local command relating to a local CAx command set.

23 Claims, 4 Drawing Sheets

(56) References Cited

U.S. PATENT DOCUMENTS

| | | | |
|---|---|---|---|
| 2014/0188437 A1* | 7/2014 | Red | G06F 17/50 |
| | | | 703/1 |
| 2014/0222387 A1* | 8/2014 | Cannon | G06F 17/5018 |
| | | | 703/1 |
| 2014/0222919 A1* | 8/2014 | Nysetvold | G06Q 10/101 |
| | | | 709/204 |
| 2014/0236550 A1* | 8/2014 | Nysetvold | G06F 17/50 |
| | | | 703/2 |
| 2014/0317589 A1* | 10/2014 | Bowman, Jr. | G06F 17/5018 |
| | | | 716/139 |
| 2015/0066554 A1* | 3/2015 | Red | G06Q 10/063112 |
| | | | 705/7.14 |
| 2015/0120252 A1* | 4/2015 | Hepworth | G06F 17/50 |
| | | | 703/1 |
| 2015/0213157 A1* | 7/2015 | Hepworth | G06F 17/50 |
| | | | 703/1 |

OTHER PUBLICATIONS

Xu, Yue, "A Flexible Context Architecture for a Multi-User GUI," Department of Mechanical Engineering, Brigham Young University, Dec. 2010.

Red, E., French, D., Hepworth, A., Jensen, G., Stone, B., "Multi-User Computer-Aided Design and Engineering Software Applications," Cloud-Based Design and Manufacturing (CBDM), Springer International Publishing, Jan. 1, 2014, pp. 25-62.

Red, E., Jensen, G., Ryskamp, J., Mix, K., "NXConnect: Multi-User CAx on a Commercial Engineering Software Application," Department of Mechanical Engineering, Brigham Young University, 2010.

* cited by examiner

SUPPORT OF UNDEVELOPED FEATURES IN MULTI-USER CAX ENVIRONMENT

BACKGROUND

This disclosure relates to computer-aided technologies (CAx), and more particularly, to visualization and editing of component designs in a computing environment.

CAx software is used to develop tools, parts, assemblies, structures and other components using a computer system during the design, analysis, and manufacturing phases, for example. CAx software may be used by a user or group of users to build, analyze, and manufacture complex elements. CAx software is typically restricted to a single user paradigm, wherein only a single user can edit a model or part file within a CAx software application at a time. The user must exit the file before another user is allowed to access it.

SUMMARY

A system for collaborating on a component according to an example of the present disclosure includes a computing device configured to execute a data module and an editing module. The data module is configured to store data corresponding to a component design in at least one database. The editing module is configured to generate at least one developed feature of the component design in response to executing at least one global command relating to a multi-user CAx command set, to generate at least one undeveloped feature of the component design in response to executing at least one local command relating to a local CAx command set, only a portion of the multi-user CAx command set being mapped to the local CAx command set, and to cause the data module to store data corresponding to at least undeveloped feature in at least one database.

In a further embodiment according to an example of the present disclosure includes, the data module is configured to store data corresponding to the at least one undeveloped feature in a native data format common with the local CAx command set, and is configured to store data corresponding to the at least one developed feature in a global data format common with the multi-user CAx command set and with the at least one database.

In a further embodiment according to an example of the present disclosure includes, the data module is configured to store data corresponding to the native data format to a first part file and data corresponding to the global data format to a second part file.

In a further embodiment according to an example of the present disclosure includes, the data corresponding to the at least one undeveloped feature in the at least one database is coordinate data corresponding to geometry of the at least one undeveloped feature.

In a further embodiment according to an example of the present disclosure includes, the data module is configured to selectively reload a local copy of the component design in response to another multi-user CAx environment storing data to the at least one database in the native format.

In a further embodiment according to an example of the present disclosure includes, the editing module is configured to communicate a notification to a second multi-user CAx environment accessing the component design in response to the data module storing data corresponding to the at least one undeveloped feature in the at least one database.

In a further embodiment according to an example of the present disclosure includes, the data module is configured to reload a local copy of the component design from the at least one database in response to receiving a notification corresponding to the at least one undeveloped feature communicated from a second multi-user CAx environment.

In a further embodiment according to an example of the present disclosure includes, the local copy includes a first part file corresponding to the at least one undeveloped feature and a second part file corresponding to the at least one developed feature.

A further embodiment of any of the foregoing embodiments includes a display module configured to display data corresponding to the local copy in response to executing the at least one local command.

In a further embodiment according to an example of the present disclosure, each of the at least one local command operable to generate the at least one undeveloped feature is distinct from the multi-user CAx command set.

In a further embodiment according to an example of the present disclosure includes, the editing module is configured to operate in a multi-user mode and a single-user mode. The editing module is configured to cause the at least one global command to execute in the multi-user mode and is configured to cause the at least one local command to execute in the single-user mode.

A system for collaborating on a component according to an example of the present disclosure includes a host server including a processor and a memory storage device. The processor is configured to execute a host multi-user CAx environment including a synchronization module. At least one database in the memory storage device is operable to store data relating to at least one developed feature of a component design in a common format and is operable to store data relating to at least one undeveloped feature of the component design in a native format. The common format corresponds to a multi-user CAx command set. The native format corresponds to a native CAx command set, and only a portion of the multi-user CAx command set is mapped to the native CAx command set. The synchronization module is configured to communicate data corresponding to at least one undeveloped feature in the native format between at least one database and at least one client multi-user CAx environment, and to communicate data corresponding to at least one developed feature in the common format between at least one database and at least one client multi-user CAx environment.

In a further embodiment according to an example of the present disclosure includes, the synchronization module is configured to cause data corresponding to the at least one undeveloped feature to be stored in a first part file and data corresponding to the at least one developed feature to be stored in a second part file.

In a further embodiment according to an example of the present disclosure includes, the at least one database is configured to link the first part file and the second part file to the component design.

In a further embodiment according to an example of the present disclosure, the synchronization module is configured to communicate a notification corresponding to the at least one undeveloped feature to the at least one client multi-user CAx environment.

In a further embodiment according to an example of the present disclosure includes, the native format is a first native format and a second native format distinct from the first native format, the at least one client multi-user CAx environment is a first environment configured to load data in the first native format and a second environment configured to load data in the second native format. The native CAx command set is a first native CAx command set relating to the first native format and a second native CAx command set relating to the second native format. The host multi-user CAx environment includes a translation module configured to map data between the first native format and the second native format.

In a further embodiment according to an example of the present disclosure includes, the at least one database is arranged according to the multi-user CAx command set but not the native CAx command set.

A method for collaborating on a component according to an example of the present disclosure includes the steps of: a) accessing from a first multi-user CAx environment at least one entry in a database relating to a component design, the component design having at least one developed feature stored in a common data format corresponding to a multi-user CAx command set; b) generating data corresponding to at least one undeveloped feature of the component design in a native format and in response to the first multi-user CAx environment causing at least one command of a native CAx command set to execute, only a portion of the multi-user CAx command set being mapped to the native CAx command set; and c) storing data in the native format to a data location linked to an entry of the database.

A further embodiment of any of the foregoing embodiments includes reloading a local copy of the component design in the first multi-user CAx environment in response to a second multi-user CAx environment storing data in the native format.

In a further embodiment according to an example of the present disclosure includes, the database is configured to store data corresponding to the at least one undeveloped feature in a first part file and is configured to store data corresponding to the at least one developed feature in a second part file. The database is configured to link the first part file and the second part file to the component design.

The various features and advantages of this disclosure will become apparent to those skilled in the art from the following detailed description. The drawings that accompany the detailed description can be briefly described as follows.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION

Figure 1:
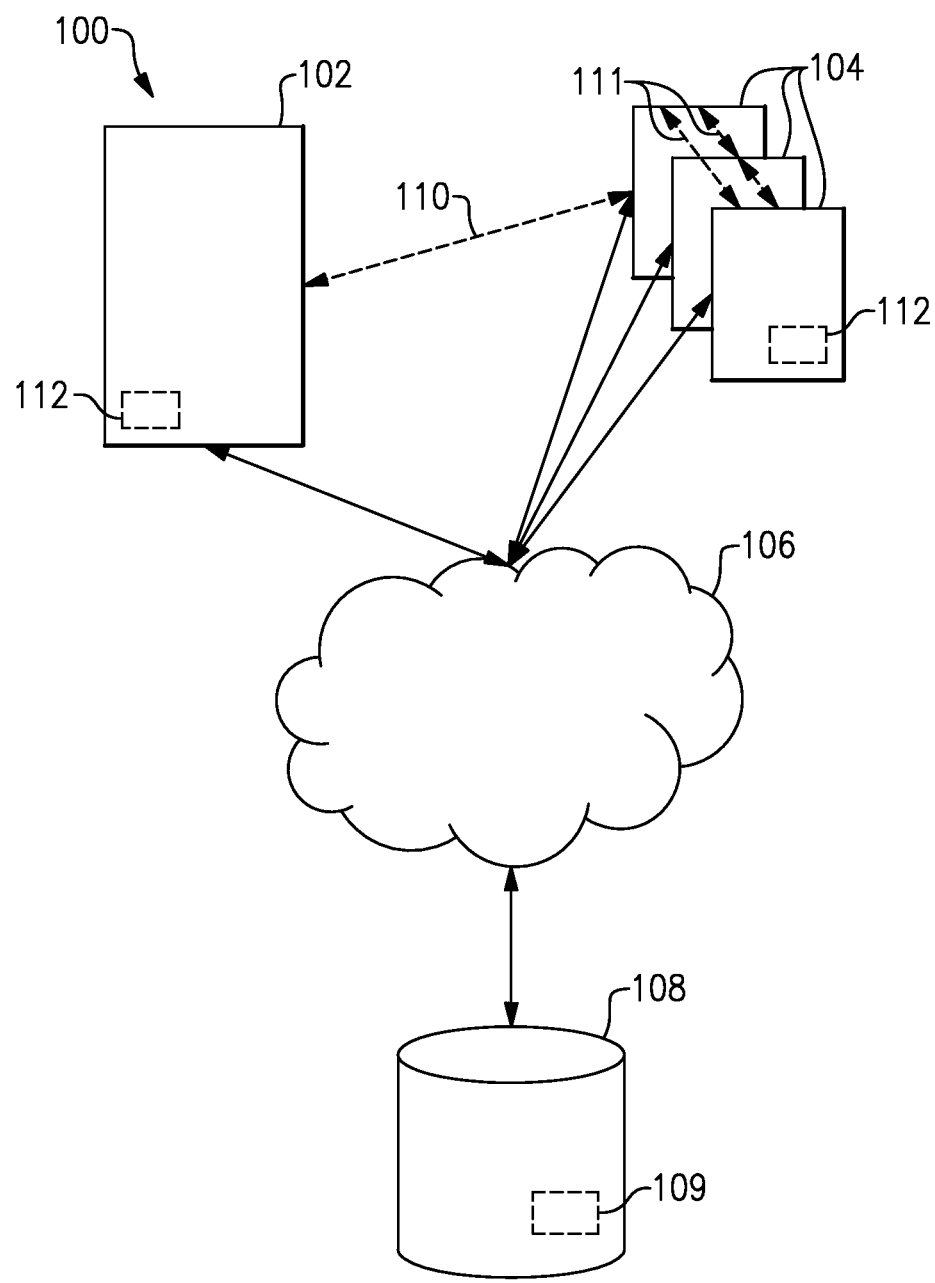
FIG. 1 illustrates a system for a multi-user CAx environment, according to an embodiment.

FIG. 1 illustrates a computing architecture or system 100 for executing a multi-user CAx environment, according to an embodiment. The system 100 includes a host computer 102. The host computer 102 may include one or more of a computer processor, memory, storage means, network device, and input and/or output devices and/or interfaces. The host computer 102 is configured to execute one or more software programs. In one embodiment, the host computer 102 is more than one computer jointly configured to process software instructions serially or in parallel.

In some embodiments, the host computer 102 is in communication with one or more networks such as a network 106 comprised of one or more computing devices. The system 100 additionally includes one or more client computers 104. The host computer 102 and the one or more client computers 104 typically include one or more of a computer processor, memory, storage means, network device and input and/or output devices and/or interfaces according to some embodiments. The memory may, for example, include UVPROM, EEPROM, FLASH, RAM, ROM, DVD, CD, a hard drive, or other computer readable medium which may store data and/or the CAx software of this description. The host computer 102 and the one or more client computers 104 may be a desktop computer, laptop computer, smart phone, tablet, or any other computer device. In some embodiments, one or more of the host computer 102 and the one or more client computers 104 include an input device, such as a keyboard and mouse, and one or more output devices such as a monitor, speakers, printers, etc. The interface facilitates communication with the other systems and/or components of the network 106.

In some embodiments of collaboration between multiple CAx users, each of the client computers 104 is a user workstation capable of accessing and locally running CAx software and providing a CAx environment 112. In some embodiments, the CAx environment 112 is operable to perform one or more CAx functions including at least one CAx tool, including a computer-aided design (CAD), computer-aided engineering (CAE) and/or computer-aided manufacturing (CAM) tool, for example. In other embodiments, at least one of the client computers 104 is operable to execute different CAx functions. In some embodiments, the CAx environment 112 provides a display or visualization of a component design stored one or more part files, according to one or more visualization settings, and can be provided via one or more graphical user interfaces (GUI).

In some embodiments, the one or more client computers 104 are configured to communicate with the host computer 102 directly via a direct client interface 110 or over the network 106. The one or more client computers 104 are configured to execute one or more software programs, such as a CAx package. In some embodiments, the CAx package is configured to communicate with the host computer 102 either over the network 106 or directly through the direct client interface 110. In another embodiment, the one or more client computers 104 are configured to communicate with each other directly via a peer-to-peer interface 111.

The network 106 may be a private local area network (LAN), a private wide area network (WAN), the Internet, a mesh network, or any other network as is known in the art. The system 100 additionally includes at least one storage system 108, which in some embodiments is operable to store or otherwise provide data to other computing devices. In one embodiment, the storage system 108 is a storage area network device (SAN) configured to communicate with the host computer 102 and/or the one or more client computers 104 over the network 106. In another embodiment, the storage system 108 is located within the host computer 102 or within at least one of the client computers 104. The storage system 108 may be configured to store one or more of computer software instructions, data, CAx files, database files, configuration information, etc.

In some embodiments, the system 100 is a client-server architecture configured to execute computer software on the host computer 102, which is accessible by the one or more client computers 104 using either a thin client application or a web browser executing on the one or more client computers 104. In some embodiments, the host computer 102 loads the computer software instructions from local storage, or from the storage system 108, into memory and executes the computer software using the one or more computer processors.

In some embodiments of the multi-user CAx architecture, each part file is stored within a database 109 at a central location, for instance at storage system 108. In another embodiment, the database 109 is stored at host computer 102 or is a distributed database provided by one or more of the client computers 104. In some embodiments, the database 109 is a relational database, and each part file in the database 109 is associated with a sub-assembly or assembly. In other embodiments, each feature, feature type, part, component design, sub-assembly and assembly corresponds to a unique identifier or database entry. In some embodiments, the database 109 is linked or otherwise corresponds to multiple part files. In an embodiment, the database 109 is configured to store data corresponding the component design one or more database records or entries, rather than linking or otherwise associating one or more part files to the database 109.

Each part file comprises one or more features, each feature corresponding to one or more feature types discussed below. In some embodiments, the part file includes a part tree or another data structure to organize and associate the features in a parent-child relationship between different features and/or part files. Each feature can be applied to one or more base features which together comprise the component design. Although the teachings of this disclosure refer primarily to featured-based CAx tools or systems, it should be appreciated that other CAx tools, systems or environments can benefit from the teachings herein, including geometrical-based CAD models.

The term "feature type" is defined as a geometric or non-geometric operation, or a result of such operation, available in a CAx tool to characterize a component design. The various feature types can be stored in one or more software libraries as one or more data classes which can be instantiated by the CAx tool.

The term "feature" refers to an instance of a feature type, which can include one or more software commands, or a result of its operation (such as a geometric object). Each feature is represented by a data set and has one or more parameters or attributes, such as a unique feature identifier, a feature type, spatial position and orientation, body type such as a wireframe or solid, and/or its hierarchical relation to other features in a part tree, for example.

Some geometric feature types include two-dimensional sketches comprised of one or more one-dimensional geometries, such as points, lines or curves, and two-dimensional geometries such as rectangles or ellipses. A sketch, in some instances, provides a rough approximation of the desired dimensioning of the various aspects of a component design. In yet other embodiments, the feature types include various operations to create or modify solid(s) or other three-dimensional geometry such as wireframes, from one or two dimensional features. These various feature types include extrude(s), revolve(s), loft(s), sweep(s), chamfer(s), boundaries, and meshes, for example. The feature types can include operations such as a Boolean operation to add or subtract one feature from another feature, a mirror or a pattern operation to replicate at least one other feature, and an edge blend operation.

Various non-geometric feature types are contemplated including datum such as point(s), plane(s), axes, and coordinate system(s) utilized to arrange or orient other features, and in some instances may not comprise a final design of the component. Other non-geometric feature types can be used to further characterize a base feature comprising a component design, such as surface shading and coloring, material composition and dimensions. Of course, many other feature types utilized to create and further define the various aspects of a component design are contemplated within the teachings of this disclosure.

These various feature types and corresponding features typically have different levels of relevance to various disciplines involved in the collaboration of a component design. Each feature type and feature can also have different levels of applicability with respect to artifacts of the design process, including two-dimensional drawings such as schematics, engineering drawings or blueprints, wireframe models, surface models, and solid models, and also as inputs to other CAx tools such as finite element analysis (FEA) and computational fluid dynamics (CFD) models.

In some embodiments, the CAx environment 112 is configured to designate one or more features or feature types as a layer. Example layers include sketches, wireframes and solids, which in some embodiments are provided by the CAx software as default layer(s). In other embodiments, a user manually selects feature(s) and/or feature type(s) to be associated with at least one layer. In some embodiments, each layer is defined at system initialization, and in other embodiments, each layer is defined during operation. Each layer is utilized to filter the selected features or feature types in a part file loaded into the CAx environment.

Multiple users each provided with a CAx environment 112 via the client computers 104 are able to simultaneously access each part file stored in the database 109 and are able to view and modify various aspects of a component design corresponding to one or more part files. In some embodiments, the part file is stored locally at the storage system 108, with local copies of the part file at the client computers 104 being synchronized periodically. Modifications to each part file are communicated to each CAx environment 112 currently accessing the part file, either in real-time or periodically utilizing a synchronization scheme. Display or visualization of the modification is therefore made substantially immediately available in CAx environments 112 accessing the same part file, which can assist the multiple users in reducing, identifying/or and resolving conflicts or inconsistencies in various aspects of a component design, thereby ensuring that a particular design intent is met.

In some situations, the multiple users who use a CAx environment 112 are assigned with different level(s) of access to the component design via a user profile. For example, the component design, or various aspects of the component design including the feature(s) or feature type(s), can be associated with one or more of the level(s) of access. In some embodiments, different levels of access are designated for users that are restricted from access due to export controls, security classification or proprietary restrictions. Other restricted and unrestricted levels of access are contemplated in this disclosure, including job disciplines and organization structures, for embodiment. Accordingly, it may be desirable to limit access to aspects of a component design depending on the level(s) of access provided to a particular user profile. In some embodiments, each user profile corresponds to one or more access lists setting the level(s) of access for each user profile.

Figure 2A:
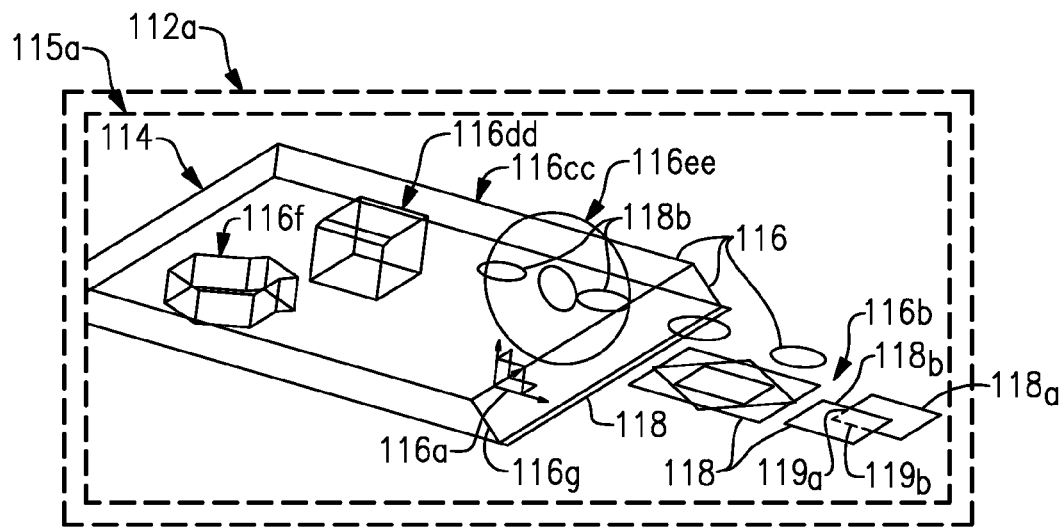
FIG. 2A illustrates a sample component design displayed in a first CAx environment, according to an embodiment.
Figure 2B:
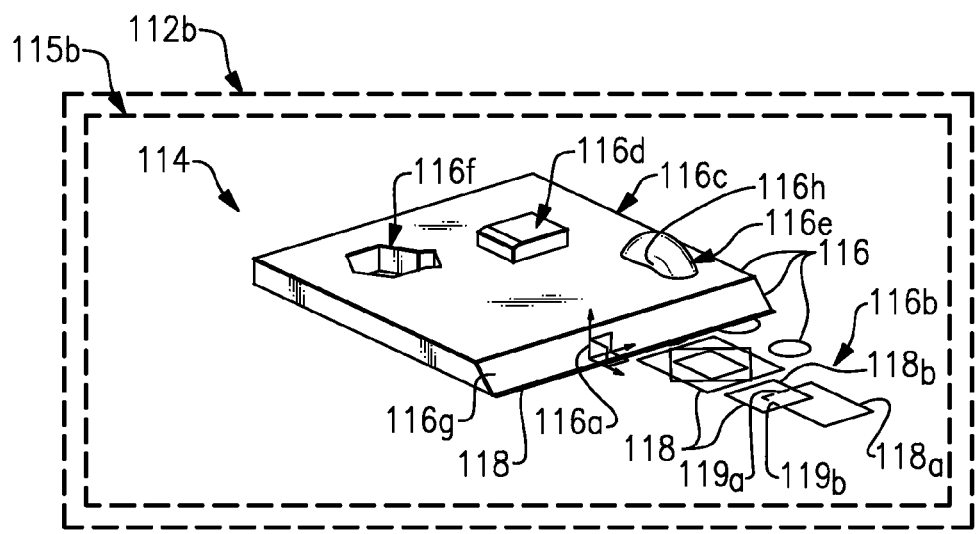
FIG. 2B illustrates the sample component design of FIG. 2A displayed in a second CAx environment, according to an embodiment.

FIGS. 2A-2B illustrate one embodiment in which two users collaborate on various aspects of a component design 114. In this embodiment, a first user is provided with a first CAx environment 112a, and a second user is provided with a second CAx environment 112b, shown in FIGS. 2A-2B respectively. Each of the CAx environments 112a, 112b is associated with a different one of the client computers 104, for example.

The sample component design 114 includes one or more features 116 each corresponding to a feature type. The features 116 shown in FIG. 2A include a datum coordinate system 116a, and a sketch 116b having one or more sketch entities or geometries 118 illustrated as ellipses and rectangles, for example. Some features 116 shown in FIG. 2B include solids such as extrudes 116c, 116d, which are applied to geometries 118 of the sketch 116b and are characterized by wireframes 116cc, 116dd shown in FIG. 2A. Other example features include a hole or Boolean 116f forming an opening in the extrude 116c, and a chamfer 116g applied to extrude 116c. Non-geometric features include surface shading 116h (shown in FIG. 2B) applied to the rotate 116e feature.

Each of the multiple users is able to select one or more visualization settings to characterize the display of the component design 114 in a viewing frustum 115 provided by a CAx environment 112 based on the particular situation, as illustrated in FIGS. 2A-2B. For the purposes of this disclosure, the term "visualization setting" means data corresponding to one or more features, feature types, layers or other parameters which can be utilized to display a component design 114 in a CAx environment 112. The term "viewing frustum" refers to a region of modeling space in a window of the CAx environment 112 modeling the component design 114 that characterizes the display of a model or component design 114, in a graphical user interface (GUI) for example. The viewing frustum is characterized by the spatial position and/or orientation of the component design 114 in the modeling space. The CAx environment 112 displays selected portions of the component design 114 stored in one or more part files based on these visualization setting(s). Accordingly, modifications or updates made by other user(s) to the component design may not be displayed in the CAx environment 112.

FIGS. 2A and 2B illustrate different visualization settings for CAx environments 112a, 112b. As illustrated by the CAx environment 112a in FIG. 2A, the user has selected one or more visualization settings to show the wireframe geometries 116cc, 116dd, 116ee and to hide the corresponding solid features 116c, 116d, 116e. In the CAx environment 112b shown in FIG. 2B, the user has selected one or more visualization settings to show solid features 116c, 116d, 116e and to hide wireframes 116c, 116d, 116f, for example. The visualization settings of each CAx environment 112 can be customized according to the needs of a particular situation even though each of the users is working on the same component design 114.

In some situations, a CAx environment includes or is otherwise provided with a multi-user command set operable to collaborate on a component design with other CAx environments. The CAx environment may also include or is otherwise provided with a native or local command set operable to edit, create and/or otherwise characterize various aspects of a component design. In some situations, only a portion of the multi-user CAx command set is mapped to the local CAx command set such that the user is able to interact with the CAx environment 112 to cause one or more commands to execute to generate one or more corresponding developed features and/or one or more corresponding undeveloped features. This may occur, for example, where the CAx environment includes a proprietary CAx tool set that has one or more commands uncommon with other proprietary or open source CAx tool sets. The multi-user CAx environment may, for example, be configured to only support commands that are common between the various CAx tool sets such that the data corresponding to the unsupported commands are not distributed in the typical manner. The multi-user CAx environment may also be configured to store data in a common data format that is different from a proprietary data format supported by the proprietary CAx tool. It may be desirable, however, for a user to share undeveloped features generated locally with other users collaborating on a component design, even if the undeveloped features are unsupported by the multi-user environment.

The term "undeveloped feature" refers to one or more commands or operations, or a result of such operation(s), in a local CAx tool that do not have corresponding function call(s), hook(s) or previously developed language in a multi-user CAx application programming interface (API) or is otherwise unsupported by a multi-user CAx tool, library or instruction set. The term "developed feature" refers to one or more commands or operations, or a result of such operation(s), in a local CAx tool that do have corresponding function call(s), hook(s), or previously developed language in the multi-user CAx application programming interface (API) and is otherwise unsupported by a multi-user CAx tool, library or instruction set.

Figure 3:
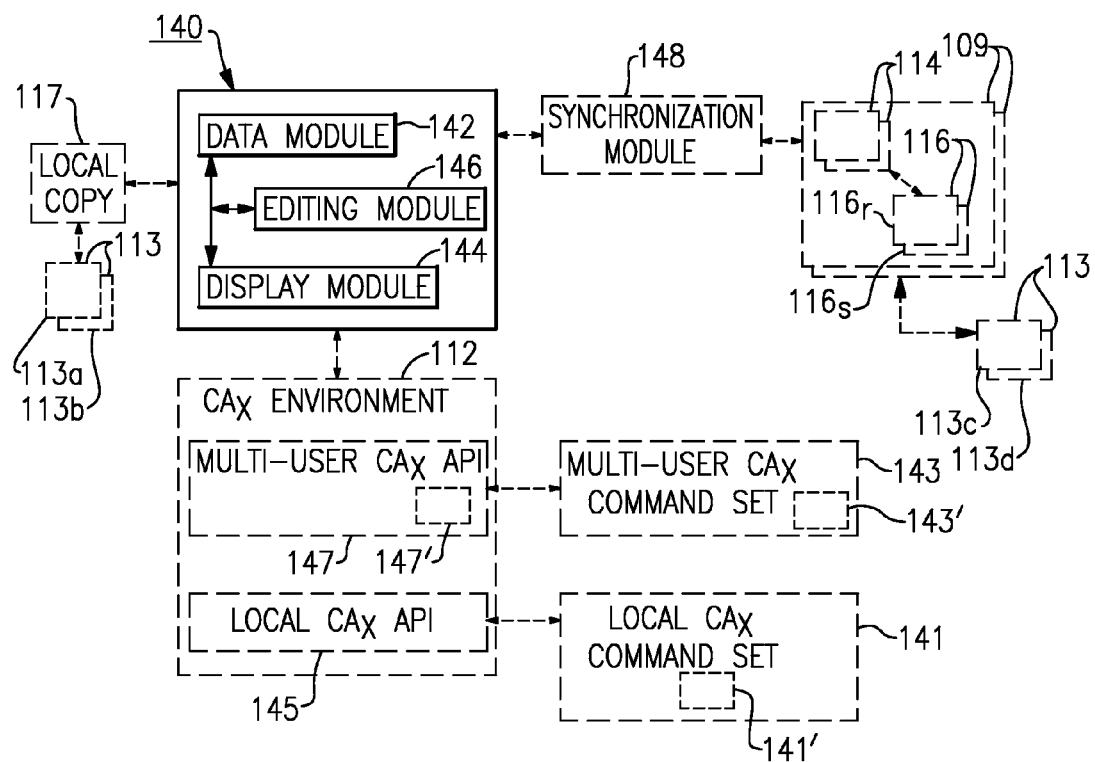
FIG. 3 illustrates a system for collaborating on a component design, according to an embodiment.

FIG. 3 illustrates a CAx package 140 for collaborating on one or more undeveloped features of a component design with another multi-user CAx environment, such as between CAx environments 112a, 112b shown in FIGS. 2A-2B, according to an embodiment. The CAx package 140 is configured to communicate various data with one or more other CAx environments such that each of the CAx environments is able to create, edit, display and/or otherwise interact with the one or more undeveloped features of a local or native CAx command set.

In some embodiments, the CAx package 140 is provided as a portion of a CAx software tool integrated into or with a CAx environment 112. In other embodiments, the CAx package 140 is a standalone software program and is configured to interface with a CAx software tool to provide the desired solution. The CAx package 140 can be provided by a tangible or non-transitory computer-readable storage medium and installed at one or more of the client computers 104 and/or the host computer 102, for example. The CAx package 140 includes one or more modules operable to access, store and/or display data corresponding to one or more component designs 114. Each of these modules includes executable software instructions and/or digital or analog hardware circuitry.

The CAx package 140 includes a data module 142 configured to access, retrieve and/or store data corresponding to one or more component designs 114. In some embodiments, the data is stored in one or more databases 109 as one or more tables, records or entries. In other embodiments, the data is stored in one or more part files 113 and is accessible by referencing one or more objects or memory locations referenced by or linked to the one or more records or entries. In one embodiment, each part file 113 or record includes data corresponding to at least one feature 116, such as any of the feature types discussed in this disclosure. In other embodiments, each database 109 organizes the data in one or more tables that include a list of part files 113 linked to a list of features 116 corresponding to a component design 114 and/or part file 113, and a list of feature types corresponding to the features 116, for example.

In one embodiment, the data module 142 is configured to create a local copy 117 of the data, which is updated or synchronized with modifications to various aspects of the component design 114 periodically or in real-time utilizing various techniques. In some embodiments, the local copy 117 includes one or more segments, data containers, partitions, or part files 113 such as part files 113a, 113b, configured to store data in different data formats. In an embodiment, the data module 142 is configured to cache data such that accessing the database 109 does not cause data corresponding to additions or changes to the component design(s) 114 and/or corresponding feature(s) 116 in the local copy 117 to update unless at least one predefined condition is met, such as by the utilization of a checkpoint or timestamp set for the corresponding component model(s) 114, for example. In some embodiments, the data module 142 is configured to reload the local copy 117 with data from the database 109.

In some embodiments, the CAx package 140 includes a display module 144. The display module 144 is configured to display data corresponding to one or more component models 114 and/or one or more features 116 in a CAx environment 112 within a viewing frustum 115, such as in one of the viewing frustums 115a, 115b of CAx environments 112a, 112b. In one embodiment, the display module 144 is configured to display data according to the local copy 117. In some embodiments, the display module 144 is configured to selectively display one or more graphical user interfaces (GUIs) operable to cause various CAx functions provided by the CAx environment 112 and related CAx tools to execute, including the creation, editing or deletion of various aspects of a component design. The GUIs may be organized according to the needs of a particular situation in accordance with the teachings of this disclosure.

In some embodiments, the CAx package 140 includes an editing module 146 configured to edit data corresponding to various aspects of the component design 114. In some embodiments, the editing module 146 selectively causes the data module 142 to access data corresponding to the component design 114 from the database 109, and in other embodiments, selectively causes the data module 142 to store the data to the local copy 117 such that the user is able to view, create and/or edit various aspects of the component design 114 within the CAx environment 112.

The editing module 146 is configured to interface with various aspects of the CAx environment 112 to characterize a component design 114. In some embodiments, the CAx environment 112 includes, or is integrated or interfaced with, a proprietary CAx software tool such as CATIA, Autodesk®, Solidworks® or Autocad®, for example, that includes, integrates, interfaces with, or is otherwise provided with one or more proprietary, native or local commands or instructions in a native or local CAx command set 141. The native commands are operable to generate one or more features 116 of a component design 114 in the CAx environment 112. The CAx environment 112 includes, integrates, interfaces with, or is otherwise provided with one or more global commands of a multi-user CAx command set 143. In one embodiment, only a select portion of the multi-user CAx command set is mapped to the local CAx command set such that calls to one or more global commands of the multi-user CAx command set 143 causes one or more corresponding native commands to execute in the CAx environment 112. The term "global command" refers to a command available to a CAx environment that can be utilized to collaborate in a multi-user CAx system. In an embodiment, the CAx environment 112 interfaces with the local CAx command set 141 via a local CAx application programming interface (API) 145 and interfaces with the multi-user CAx command set 143 via a multi-user CAx API 147, although other arrangements are contemplated. The term "local command" refers to one or more commands supported by a CAx software tool that are available to a CAx environment. Each command set 141, 143 and/or API 145, 147 can be programmed in the CAx software directly, provided as one or more software plug-ins adapted to work with the native CAx software, or provided in a standalone program to interface with the native CAx software to provide the desired solution.

In some embodiments, the editing module 146 is configured to execute in at least a multi-user mode and a single-user mode. In the multi-user mode, the editing module 146 is configured to cause at least one global command to execute to characterize a component design 114 and/or one or more features 116, which may cause one or more local commands to execute. In the single-user mode, the editing module 146 is configured to cause at least one native or local command to execute to characterize a component design 114 and/or one or more features 116. However, in some embodiments, data generated by execution of the local commands is not compatible with the arrangement of the database 109, the multi-user CAx command set 143 and/or the multi-user CAx API 147. In this manner, data generated by execution of the local commands is not synchronized between each CAx environment 112 accessing the component design in the database 109.

Accordingly, the CAx environment 112 is provided with one or more additional instructions operable to communicate data generated by the local commands to the database 109. In one embodiment, the multi-user CAx command set 143 includes one or more interoperability commands 143', which may be executed by or otherwise mapped to one or more corresponding local commands 145' of the multi-user CAx API 147, to store data corresponding to undeveloped feature(s) and generated by the local command(s) to the database 109.

In this manner, the editing module 146 is configured to cause at least one undeveloped feature 116 of the component design 114 to be generated in response to causing at least one local command 141' relating to a local CAx command set 141 to execute. In turn, the editing module 146 is configured to cause at least one interoperability command 143' to execute in response to causing the at least one local command 141' to execute, such as by making a function call 147' to the multi-user CAx API 147.

The editing module 146 is configured to cause the data module 142 to store data corresponding to one or more undeveloped features 116 of the component design 114 to the database 109. In one embodiment, the data module 142 is configured to store data corresponding to the at least one undeveloped feature 116 in the native data format common with the local CAx command set 141, and is configured to store data corresponding to the at least one developed feature 116 in the global data format common with the multi-user CAx command set 143 and with the database 109. In this arrangement, each CAx environment 112 provided with the multi-user CAx command set 143 is able to generate various developed features 116 of the component design 114, and each CAx environment 112 provided with the local CAx command set 141 is able to generate various undeveloped features 116 of the component design 114, even if other CAx environments 112 are unable to generate, display and/or load the undeveloped features 116. Rather, users provided with CAx environments 112 having additional capabilities in a particular local CAx command set 141 but unsupported by the multi-user CAx environment or command set 143 are able to collaborate on those aspects of the component design 114. This may be particularly desirable where different users, teams or organizations are provided with different proprietary CAx tools or systems but desire to collaborate with each other.

For example, each of the CAx environments 112a, 112b shown in FIGS. 2A-2B could be provided with a local CAx command set 141 that includes a trim command operable to generate a trim feature. The trim command could be operable to trim unwanted edges 119a, 119b (shown in dashed lines) of geometry 118a that intersects geometry 118b. Execution of the trim command in the local CAx command set 141 would cause the edges 119a, 119b to be removed from geometry 118a in CAx environments 112a, 112b, even though the trim command is unsupported by the multi-user CAx command set 143. Another CAx environment 112, however, may not be provided with a local command set operable to execute the trim command or otherwise display or load a corresponding trim feature.

Various arrangements of the database 109 are contemplated. In one embodiment, the database 109 is configured to store the data corresponding to one or more undeveloped features 116 in a raw format such as the native format. In another embodiment, the data module 142 is configured to store data corresponding to undeveloped features 116 in a first location and data corresponding to developed features 116 in a second, different location. In an embodiment, the data module 142 is configured to store the data to different part files 113 linked to the database 109, such as part file 113c in the global data format and part file 113d in the native data format. In one embodiment, the data corresponding to the at least one undeveloped feature is stored in the database 109 and/or a part file 109 as coordinate data corresponding to geometry of the particular undeveloped feature 116. In another embodiment, the data is stored directly in the database 109 as different record entries 116r, 116s corresponding to the global and native data formats.

In some embodiments, the data module 142 is configured to selectively reload the local copy 117 in response to another multi-user CAx environment 112 storing data to the at least one database 109 in the native format, such as data corresponding to one or more undeveloped features 116 of a component design 114. In an embodiment, the display module 144 is configured to display data corresponding to the local copy 117 in response to causing at least one local command of the local CAx command set 141 to execute, such as during a loading process, thereby generating one or more undeveloped features 116 in the viewing frustum 115.

Various techniques or predetermined criteria for causing the data module 142 to selectively reload the local copy 117 are contemplated. In one embodiment, the data module 142 is configured to selectively reload the local copy 117 in response to another CAx environment 112 storing data to the database 109 in the native format, by periodically polling the database 109, for example. In another embodiment, at least one predetermined criterion is based on at least one predetermined time threshold, such as an elapsed time since the data module 142 last accessed the database 109 and/or stored various data in the local copy 117.

In another embodiment, the data module 142 is configured to reload the local copy 117 in response to receiving a notification from another CAx environment 112. The data module 142 may be configured to selectively accept the notification by user interaction with one or more graphical user interfaces (GUIs), or by setting or otherwise designating the one or more predetermined criterion during execution of the CAx environment 112 or at system configuration or run-time, for example. In one embodiment, the predetermined criterion is at least partially based on various aspects of a component design, such as features, feature types, layers, user profiles or group of profiles, and/or unique names or identifiers which corresponds to a particular assembly model, part file, component design and/or feature, for example.

Various techniques for generating a notification are contemplated. In one embodiment, the editing module 146 is configured to communicate a notification to other multi-user CAx environments 112 accessing or otherwise collaborating on a particular component design 114. In another embodiment, the notification is generated in response to the data module 142 storing data corresponding to the at least one undeveloped feature 116 in the at least one database 109 and/or part file 113 linked to the database 109. In another embodiment, the notification is generated in response to communicating the data in one or more messages to another multi-user CAx environment 112, utilizing a peer-to-peer technique, for example.

In some embodiments, the data module 142 interfaces or otherwise communicates with a synchronization module 148 to provide the desired solution. The synchronization module 148 is configured to communicate data corresponding to developed features 116 in a common data format and undeveloped features 116 in a native format between the database 109 and one or more client multi-user CAx environments 112. The data may be communicated in separate data messages, objects or links, or part files 113, for example. In some embodiments, the host computer 102 provides the synchronization module 148 as one or more software services. In another embodiment, each of the client computers 104 is operable to execute an instance of the synchronization module 148. In one embodiment, a single computing platform such as the host computer 102 or one of the client computers 104 is configured to execute the data module 142 and/or the synchronization module 148. In some embodiments, the synchronization module 148 communicates or otherwise facilitates the communication of notifications corresponding to undeveloped features 116.

Figure 4A:
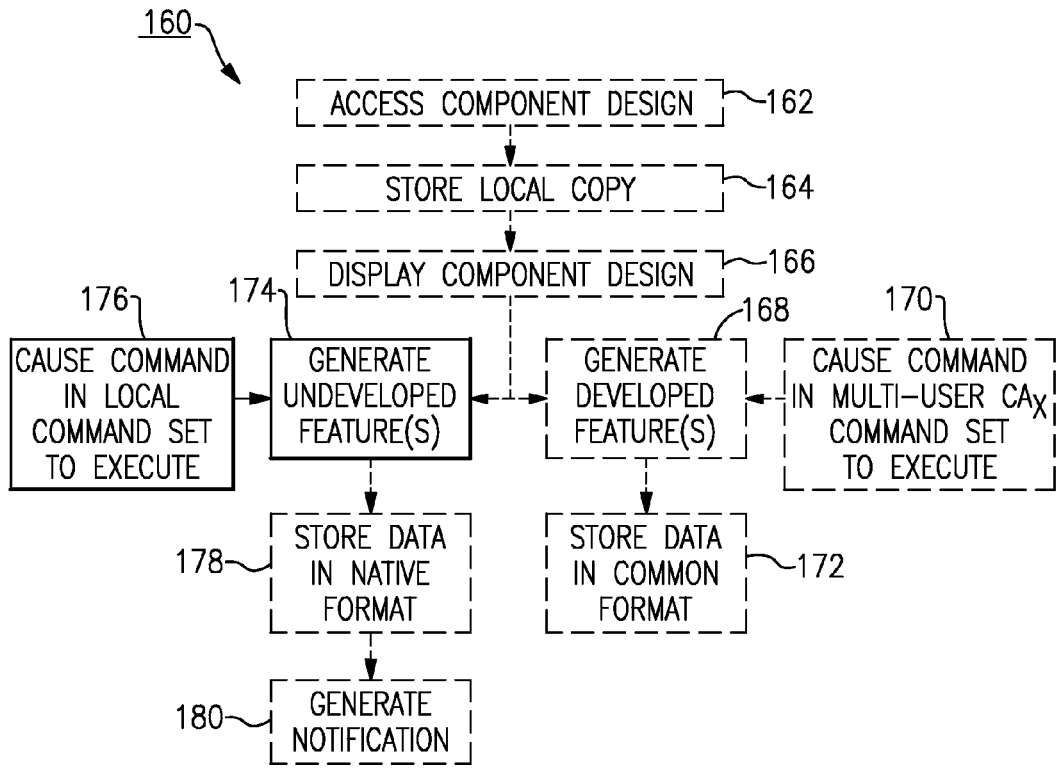
FIG. 4A illustrates a process for communicating data corresponding to a component design, according to a first embodiment.

FIG. 4A illustrates an algorithm 160 in a flowchart for storing data corresponding to a component design, utilizing any of the techniques described in this disclosure and the CAx package 140 shown in FIG. 3 according to the process flow of FIG. 4A, according to an embodiment. In some embodiments, the algorithm 160 is executed at least in part within a multi-user CAx environment, such as one of the CAx environments 112a, 112b shown in FIG. 2A-2B.

In some embodiments, a CAx environment accesses data relating to a component design or at least one record or entry relating to a component design in at least one database at block 162, and stores a local copy of the data corresponding to the component design is stored in the CAx environment at block 164. The CAx environment displays data corresponding to the component design in the local copy, for example, at block 166.

A user is able to interact with the CAx environment to cause one or more developed features to be generated at block 168, which in some embodiments, is generated in response to one or more global commands in a multi-user CAx command set to execute at block 170. One or more local or native commands in a local or native CAx command set may execute in response to executing the one or more global commands. In some embodiments, data corresponding to the developed features is stored in the database in a common format, or may be sent directly to another CAx environment in a common format, for example, at block 172.

In some embodiments, a user interacts with the CAx environment to cause one or more undeveloped features to be generated at block 174, which in some embodiments, is generated in response to one or more local or native commands in a local or native CAx command set to execute at block 176. In some embodiments, data corresponding to the undeveloped features is stored in the database in a native format, or may be sent directly to another CAx environment in a native format, for example, at block 178. In some embodiments, the algorithm 160 causes one or more notifications to be generated at block 180, which are communicated to one or more other CAx environments accessing or otherwise collaborating on the same component design.

Figure 4B:
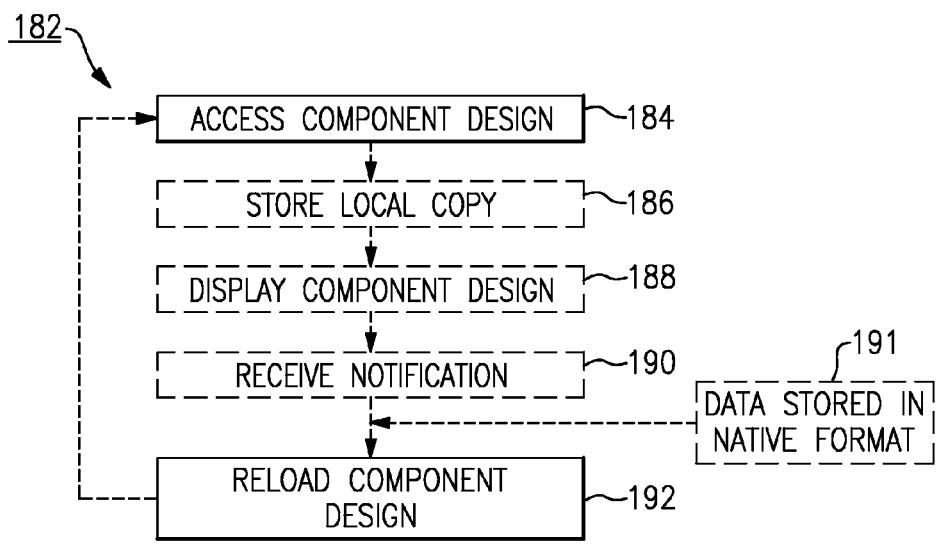
FIG. 4B illustrates a process for communicating data corresponding to a component design, according to a second embodiment.

FIG. 4B illustrates an algorithm 182 in a flowchart for receiving data corresponding to a component design, utilizing any of the techniques described in this disclosure and the CAx package 140 shown in FIG. 3 according to the process flow of FIG. 4A, according to an embodiment. In some embodiments, the algorithm 182 is executed at least in part within a multi-user CAx environment, such as one of the CAx environments 112a, 112b shown in FIG. 2A-2B. Algorithm 182 is configured to execute blocks 184, 188 and 188 in a similar manner as blocks 162, 164, and 166 of algorithm 160, and therefore blocks 184, 188 and 188 are not further discussed.

In an embodiment, the CAx environment receives one or more notifications corresponding to one or more undeveloped features of a component design at block 190, which may be communicated from one or more other CAx environments accessing or otherwise collaborating on the same component design. In some embodiments, another CAx environment stores data corresponding to one or more undeveloped features in a native format at block 191, such as in one or more part files or record entries. At block 192 the CAx environment reloads data corresponding to the component design from the database or from another CAx environment, thereby permitting the user provided with the CAx environment to view and/or edit the undeveloped features.

The algorithms 160, 182 can programmed in the CAx software directly, provided as one or more software plug-ins adapted to work with the native CAx software, or provided in a standalone program to interface with a CAx package to provide the desired solution. While the CAx package 140 and the algorithms 160, 182 are described above in the context of a multi-user CAx environment executed on at least one host computer 102 or client computer 104, it should be understood that other CAx tools and architectures may benefit from the teachings of this disclosure. It should also be understood that the host computer 102, client computer 104 or other computing device running a multi-user CAx environment 112 can be programmed with multiple additional tools, and the various features and tools included can be configured to interoperate with each other according to known principles.

Although the discussed embodiments illustrate a specific component, examples or embodiments of this disclosure are not limited to those particular combinations. One of skill in the art having the benefit of this disclosure will recognize that it is possible to use some of the components or features from one of the embodiments in combination with features or components from another one of the embodiments. Furthermore, various embodiments may include one or more alternative sub-embodiments within them, while other embodiments may include a different subset of embodiments. In addition, it will be understood that in various embodiments, a module may be a single module, or in some embodiments, the function of a single module may incorporate the features of multiple modules.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A system for collaborating on a component, comprising:
at least one computing device including a processor configured to execute a data module and an editing module;
a database in a memory storage device on a host server, the database accessible by at least two client multi-user CAx environments;
the data module is configured to store a component design in the database;
the editing module is configured to generate developed feature data of the component design in response to executing a global command relating to a multi-user CAx command set, to generate undeveloped feature data of the component design in response to executing at least one local command relating to a local CAx command set, only a portion of the local CAx command set being mapped to the multi-user CAx command set wherein each of the undeveloped feature data and the developed feature data is supported by the local CAx command set but the undeveloped feature data is unsupported by the multi-user CAx command set, and to cause the data module to store undeveloped feature data and the developed feature data in the database; and
the data module is configured to store the undeveloped feature data to the database in a native data format common with the local CAx command set, and is configured to store the developed feature data to the database in a global data format common with the multi-user CAx command set and the database.

2. The system as recited in claim 1, wherein the data module is configured to store the native data format to a first part file and the global data format to a second part file.

3. The system as recited in claim 1, wherein the undeveloped feature data in the database is coordinate data.

4. The system as recited in claim 1, wherein the data module is configured to selectively reload a local copy of the component design in response to another multi-user CAx environment storing data to the database in the native data format.

5. The system as recited in claim 1, wherein the editing module is configured to communicate a notification to a second multi-user CAx environment accessing the component design in response to the data module storing the undeveloped feature data in the database.

6. The system as recited in claim 1, wherein the data module is configured to reload a local copy of the component design from the database in response to receiving a notification corresponding to the undeveloped feature data communicated from a second multi-user CAx environment.

7. The system as recited in claim 6, wherein the local copy includes a first part file corresponding to the undeveloped feature data and a second part file corresponding to the developed feature data.

8. The system as recited in claim 6, comprising a display module configured to display the local copy in response to executing the at least one local command.

9. The system as recited in claim 1, wherein each of the at least one local command operable to generate the undeveloped feature data is distinct from the multi-user CAx command set.

10. The system as recited in claim 1, wherein the editing module is configured to operate in a multi-user mode and a single-user mode, the editing module configured to cause the at least one global command to execute in the multi-user mode and configured to cause the at least one local command to execute in the single-user mode.

11. The system as recited in claim 1, wherein the data module is configured to generate a local copy of the component design, the local copy being separate and distinct from the at least one database.

12. A system for collaborating on a component, comprising:
    a host server including a processor and a memory storage device, the processor configured to execute a host multi-user CAx environment including a synchronization module, a database in the memory storage device operable to store developed feature data of a component design to the database in a global data format common with a multi-user CAx command set and the database, and is operable to store undeveloped feature data of the component design to the database in a native data format in common with the local CAx command set and only a portion of the local CAx command set being mapped to the multi-user CAx command set wherein each of the undeveloped feature data and the developed feature data is supported by the local CAx command set but the undeveloped feature data is unsupported by the multi-user CAx command set; and
    the synchronization module is configured to communicate the undeveloped feature data in the native data format between the database and at least one client multi-user CAx environment, and to communicate the developed feature data in the common format between the database and the at least one client multi-user CAx environment.

13. The system as recited in claim 12, wherein the synchronization module is configured to cause the undeveloped feature data to be stored in a first part file and the developed feature data to be stored in a second part file.

14. The system as recited in claim 13, wherein the database is configured to link the first part file and the second part file to the component design.

15. The system as recited in claim 12, wherein the synchronization module is configured to communicate a notification corresponding to the undeveloped feature data to the at least one client multi-user CAx environment.

16. The system as recited in claim 12, wherein the native data format is a first native format and a second native format distinct from the first native format, the at least one client multi-user CAx environment is a first environment configured to load data in the first native format and a second environment configured to load data in the second native format, the local CAx command set is a first local CAx command set relating to the first native format and a second local CAx command set relating to the second native format, and the host multi-user CAx environment includes a translation module configured to map data between the first native format and the second native format.

17. The system as recited in claim 12, wherein the database is arranged according to the multi-user CAx command set but not the local CAx command set.

18. The system as recited in claim 12, wherein the global data format and the native data format are separate and distinct data formats.

19. The system as recited in claim 18, wherein the native data format in the at least one database is coordinate data.

20. A method for collaborating on a component, comprising the steps of:
    a) accessing from a first multi-user CAx environment at least one entry in a database relating to a component design, the component design having developed feature data stored in a global data format common with a multi-user CAx command set, the database accessible by a second multi-user CAx environment and a third multi-user CAx environment;
    b) generating undeveloped feature data of the component design in a native data format and in response to the first multi-user CAx environment causing at least one command of a local CAx command set to execute, only a portion of the local CAx command set being mapped to the multi-user CAx command set wherein each of the undeveloped feature data and the developed feature data is supported by the local CAx command set, but the undeveloped feature data is unsupported by the multi-user CAx command set such that the second multi-user CAx environment is able to load the undeveloped feature data but the third multi-user CAx environment is unable to load the undeveloped feature data; and
    c) storing data in the native data format to a data location linked to an entry of the database, including storing data to the database in the native data format common with the local CAx command set, the global data format and the native data format being separate and distinct data formats in the database.

21. The method as recited in claim 20, comprising reloading a local copy of the component design in the first multi-user CAx environment in response to the second multi-user CAx environment storing data in the native data format.

22. The method as recited in claim 20, wherein the database is configured to store the undeveloped feature data in a first part file and is configured to store the developed feature data in a second part file, and the database is configured to link the first part file and the second part file to the component design.

23. The method as recited in claim 20, comprising generating a local copy of the component design in the first multi-user CAx environment, the local copy separate and distinct from the database.

* * * * *